United States Patent [19]
Nishimura

[11] Patent Number: 5,427,305
[45] Date of Patent: Jun. 27, 1995

[54] PROCESS FOR BRAZING A METAL IN A CONTINUOUS MANNER

[76] Inventor: Makoto Nishimura, No. 1-28-5, Toyotama-naka, Nerima-ku, Tokyo, Japan

[21] Appl. No.: 150,353
[22] Filed: Nov. 9, 1993
[30] Foreign Application Priority Data Nov. 10, 1992 [JP] Japan .................. 4-323747

[51] Int. Cl.⁶ .......... B23K 5/213; B23K 5/22
[52] U.S. Cl. ................. 228/233.2; 228/902
[58] Field of Search ............ 228/232, 233.2, 902, 228/262.51

[56] References Cited

U.S. PATENT DOCUMENTS

| | | | |
|---|---|---|---|
| 3,756,489 | 9/1973 | Chartet | 228/43 |
| 3,769,675 | 11/1973 | Chartet | 228/183 |
| 4,918,805 | 4/1990 | Ligzka et al. | 228/232 X |
| 5,232,145 | 8/1993 | Alley et al. | 228/232 X |
| 5,289,968 | 3/1994 | Maeda et al. | 228/233.2 |

FOREIGN PATENT DOCUMENTS 48-26652  4/1973  Japan .
63-80964  4/1988  Japan .

*Primary Examiner*—Mark Rosenbaum
*Assistant Examiner*—Jeanne M. Epel
*Attorney, Agent, or Firm*—Browdy and Neimark

[57] ABSTRACT

In a process for brazing a metal in a continuous manner, a work consisting of a base metal and a part to be brazed thereto is disposed in a box-shaped heat retaining container which is opened at its upper portion to surround lower and side surfaces of the work and fixing the work by a retaining jig. The work within said heat retaining container is heated by a continuous combustion in a gas burner, so that the temperature of said work is raised to a predetermined preheating temperature. Then, the work is subjected to a soaking treatment at the preheating temperature by switching-over the combustion in the gas burner to a pulse combustion. The continuous combustion in the gas burner is restarted to raise the temperature of the work to a brazing temperature, and then, the part is brazed to said base metal with the temperature of the work maintained at the brazing temperature by switching-over the combustion in the gas burner to a pulse combustion.

1 Claim, 7 Drawing Sheets

PROCESS FOR BRAZING A METAL IN A CONTINUOUS MANNER

BACKGROUND OF THE INVENTION

1. Field of the Invention

The present invention relates to a process for brazing a metal, and particularly, to a process and apparatus for brazing a metal having a high efficient of thermal expansion such as aluminum, copper or the their alloy in the atmosphere by heating by means of a gas burner, wherein a series of operations such as setting, preheating and brazing of a work can be conducted continuously.

2. Description of the Prior Art

There are various proposals made from old times for the automation of a process for brazing a metal and particularly an aluminum article.

For example, a brazing apparatus is disclosed in Japanese Patent Application Laid-open No. 26652/73, in which a work with a brazing filler metal previously applied thereto is placed onto a conveyer and carried through a heating furnace which is divided into six sections, whereby the work is sequentially subjected to drying, preheating, brazing, precooling, annealing and cooling steps during such passage thereof.

An example of an apparatus in which the individual steps are conducted continuously using a turn table is an apparatus described in Japanese Patent Application Laid-open No. 80964/88 previously proposed by the present inventors. In this apparatus, eight work retaining devices are mounted on the turn table, and a work setting step, a work preheating step divided into several stages, a brazing regular heating step, a cooling step and a product removing step are sequentially conducted with turning of the turn table.

In the apparatus described in Japanese Patent Application Laid-open No. 26652/73, the brazing of an aluminum article can be carried out continuously, only by strictly performing a temperature control for sequentially conducting the drying, preheating, brazing, precooling, annealing and cooling steps by using an electric heater and a gas burner for heating and a large-scaled tunnel furnace. This requires great costs of equipment and operation. In a small-scaled production line for making products in a diversified small-quantity production, this apparatus is not commercially practicable from the respect of cost and hence, cannot be employed by any possibility.

The apparatus described in Japanese Patent Application Laid-open No. 80964/88 has been developed by the present inventors for use in a small-scaled production line using a gas burner in the atmosphere. In this apparatus, however, the work is directly heated by the gas burner and hence, a considerable difference in temperature may be produced in the work between a portions near flame from the burner and a portion remoter from the flame, thereby causing a deformation of the work. Therefore, such apparatus can be used practically to a certain extent for brazing of relatively fast works, for example, bonding of a half union with a pipe in a car cooler, but has a disadvantage that it cannot be used practically for works delicate to a thermal shock and works having a shape difficult to heat uniformly, because many fraction defectives are provided. In addition, the prior art process described in such patent also has a disadvantage that a long time is taken for heating the work to a brazing temperature and as a result, the efficiency of production is not enhanced. Further, a variation in work heating time may be produced due to a change in season and a variation in atmospheric temperature in one day, and a corresponding fine control of the temperature is difficult, resulting in defective brazed articles being often produced.

SUMMARY OF THE INVENTION

Accordingly, it is a first object of the present invention to provide a process for brazing a metal, wherein the above-described disadvantages are eliminated, thereby preventing the deformation of a work by an uniform heating of the work, and there is less variability of products due to a variation in temperature of surroundings owing to a change of season or the like, and moreover, the heating time can be shortened to provide an enhanced efficiency of operation.

It is a second object of the present invention to provide a process for brazing a metal, wherein a series of operations for brazing a metal can be performed continuously and automatically.

It is a third object of the present invention to provide a process for brazing a metal and an apparatus therefore, wherein even for a work which is thin and delicate to a thermal shock, such as an aluminum kettle or teapot, a brazing operation can be conducted without occurrence of a deterioration due to overheating or a deformation due to non-uniform heating, thereby providing a good finish.

To achieve the above objects, the present inventors have made zealous studies and developments and as a result, have found the following fact: In order to exclude an influence of an external atmosphere to provide an increased heating efficiency, and to promote the uniformization of the temperature profile for the work, it is effective, for eliminating the disadvantages associated with the prior art processes, that the periphery of a work is surrounded by a heat insulating wall, so that flame from a gas burner is not directed directly to the work, but is directed to a jig or a base and reflected therefrom, thereby indirectly heating the work by the reflected flame, that the work is heated to a regular brazing temperature after uniformization of the temperature of the entire work in a preheating temperature by a soaking treatment by a pulse combustion in the gas burner, and that a measure is taken for performing the brazing while maintaining the work at a given regular brazing temperature under a control of the heating temperature provided by the pulse combustion in the gas burner. Thus, the present invention has been accomplished.

According to the present invention, the above objects are achieved by providing a process for brazing a metal in a continuous manner, comprising the steps of disposing a work consisting of a base metal and a part to be brazed thereto in a box-shaped heat retaining container opened at its upper portion to surround lower and side surfaces of the work and fixing the work by a retaining jig, heating the work within the heat retaining container by a continuous combustion in a gas burner to raise the temperature of the work to a predetermined preheating temperature and then subjecting the work to a soaking treatment at the preheating temperature by switching-over the combustion in the gas burner to a pulse combustion, and restarting the continuous combustion in the gas burner to raise the temperature of the work to a brazing temperature and then brazing the part to the base metal with the temperature of the work maintained at the brazing temperature by switching-over the combustion in the gas burner to a pulse combustion.

In addition, according to the present invention, there is provided an apparatus for brazing a metal, comprising a transfer means for intermittently transferring a work along a production line, a plurality of box-shaped heat retaining containers mounted at constant distances on the transfer means and opened at its upper portion to surround lower and side surfaces of the work, a retaining jig provided for each of the heat retaining containers for fixing the work, at least one work-preheating gas burner disposed along the production line and constructed so that a continuous combustion and a pulse combustion are switched-over from one to another, and at least one regular brazing gas burner disposed along the production line downstream from the work-preheating gas burner and constructed so that a continuous combustion and a pulse combustion are switched-over from one to another.

With the above features of the present invention, the work can be heated in a short time without reception of any influence of a surrounding temperature, wind or the like by fixing the work within the box-shaped heat retaining container and heating it by the gas burner, leading to an enhanced safety of operation and an enhanced productivity.

After the temperature of the work has been raised to the predetermined preheating temperature, the work is subjected to the soaking treatment while being maintained at the given preheating temperature, and then, the temperature of the work is raised to the brazing temperature. Therefore, the temperature of even a work delicate to a thermal shock such as a kettle of aluminum can be raised to the brazing temperature without occurrence of a thermal strain and a deformation.

Further, even at the brazing step, the brazing is conducted in a condition in which the temperature of the work is maintained at the brazing temperature by the pulse combustion. Therefore, a skin scorching due to overheating and a dropping of a filler metal due to lack of the temperature cannot be caused, thereby enabling a reduction in fraction defective. Yet further, the flowing of the filler metal is smooth to enable a brazing which provides a clean finish, thereby omitting post-treatment such as rasping of the brazed point or the like and providing an enhanced quality of product.

Work

The present invention is particularly effective for brazing works which are high in heat transfer coefficient and delicate to a thermal shock, such as aluminum and steel, but also effective for brazing works such as brass, iron and stainless steel. However, the brazing of aluminum is most difficult, but the features of the present invention can be exhibited for the brazing of aluminum. Therefore, the present invention will be described as for the brazing of aluminum.

Heat retaining container

In this way, it is extremely important matter in the present invention to accommodate a work in the heat retaining container to heat the work. It is desirable that the heat retaining container covers the entire work in order to maintain the temperature of the work at a desired temperature with an external influence eliminated, but on the other hand, if even the upper portion of the work is covered, a brazing operation is obstructed. Therefore, a box-shaped heat retaining container opened at its upper portion to surround lower and side surfaces of the work is used in the present invention. The shape of the container need not necessarily be limited to the rectangular shape, and any other shape such as polygonal, circular and the like can be employed depending upon the shape of a work.

The height of the container need not necessarily be a value enough to accommodate the entire work, and may be a value enough to cover approximately two-thirds of the entire work. Moreover, a portion to be brazed may lie at a location higher than an opening of the heat retaining container in an exposed state. Rather, it is important to determine the shape and size of the heat retaining container depending upon the shape of a work so as to ensure a uniformized temperature profile for the entire work. The heat retaining container also serves to receive flame directed from the gas burner to the container to reflect the flame, thereby heating the entire work uniformly in an indirect heating manner.

In addition, it is important that the heat retaining container itself is mounted on a machine stand in a heat insulting manner to enure that a heat resulting from the heating by the flame from the gas burner is prevented from being escaped. For this purpose, it is effective to mount the heat retaining container in the machine stand in a heat insulating manner, or to attach a single leg or a plurality of legs to the heat retaining container and mount the latter on the machine stand with an air layer interposed therebetween.

Preheating of work

The work preheating temperature is varied depending upon the quality of a work and the types of a brazing filler metal and a flux, but in the case of aluminum, a preheating temperature of about 450° C. is preferred. The entire work is heated uniformly to such preheating temperature and then, the temperature of the work is raised quickly up to about 590° C. which is a brazing temperature.

In this manner, the work is maintained at the preheating temperature of about 450° C., and when the temperature of the work becomes uniform, it is raised to the brazing temperature. Therefore, it is possible to raise the temperature of the work to the brazing temperature in a condition in which the inside of the work has no temperature gradient. Consequently, a deformation of the work, a skin scorching and the like cannot occur at all. Moreover, the flux is heated to the brazing temperature while being maintained in a semi-molten state and hence, when the brazing temperature has been reached, the melting of the flux and the melting of the brazing filler metal occur at one time, thereby providing a good flowing of the filler metal to ensure a brazing which provides an extremely good finish.

The preheating of the work may be such that the work at ambient temperature is heated at one time to the preheating temperature, i.e., about 450° C. by the continuous combustion in the gas burner, but it is preferable that the work is heated stepwise at several times in order to prevent a thermal strain from being produced in the work. For example, the work at ambient temperature is once heated to 200° C. by the continuous combustion in the gas burner and at this time point, the work is subjected to the soaking treatment for several seconds by the pulse combustion. When the temperature of the entire work becomes uniform, the work is heated to 450° C. by the continuous combustion in the gas burner. With this method, it is possible to heat even a work delicate to a heat such as an aluminum kettle without generation of any thermal strain.

If the several stages into which the preheating step is divided in this manner are performed by the heating by exclusive gas burners, respectively, it is extremely effective for shortening the heating time.

When the preheating is carried out at two, three or more stages in this manner, it is not necessary to conduct the pulse combustion for the soaking treatment attendant on all of the stages. With a work relatively strong to a heat, the pulse combustion for the soaking treatment may be conducted only at the final preheating stage. On the other hand, with a work delicate to a heat, it is preferable that the pulse combustion is conducted at every stage to effect the soaking treatment of the work.

Pulse combustion

It is important for soaking the temperature of the entire work as described above to maintain the work at a predetermined constant preheating temperature, but for this purpose, it is essential to use a special gas burner having a function of pulse combustion.

This special gas burner is designed so that a usual continuous combustion and a pulse combustion can be switched over from one to another by changing a fuel gas and air supplying manner. This pulse combustion is a combustion method for intermittently effect the burner combustion with an extremely short period, and can be carried out by a gas burner including a switch mechanism such as a solenoid valve provided in a gas and air feed pipe and adapted to be repeatedly turned ON and OFF periodically by a control mechanism.

The temperature of the work can be maintained at a given value by properly setting the ON-OFF period and the ON/OFF ratio (duty ratio) in the pulse combustion.

For example, the conditions for the pulse combustion for maintaining the temperature of the work at 450° C. are such that if the pulse period (time from the now turning-ON to the next turning-ON) is set at 2 seconds, the ON/OFF ratio may be set at 50%:50%.

Soaking treatment

Because the pulse combustion is a combustion method for intermittently effect the burner combustion in such a manner that the supply of a gas and air is switched ON and OFF at an interval of short time in this manner, the raising of temperature by heating and the dissipation of heat by interruption of the combustion are repeated alternately, so that the temperature of the work is raised and lowered with the passage of time, thereby providing a wave-like temperature profile, as shown in FIG. 7. The temperature range in which the temperature of the work is raised and lowered by the pulse combustion is dependent upon a caloric force of the gas burner, the period of the pulse combustion and the like, but usually, may be of from 10° C. to 25° C.

However, the temperature of the work is higher at a portion near flame from the burner and lower at a portion remote from the flame. In FIG. 7, a curve a indicates the temperature of a high-temperature portion of the work having the highest temperature, and a curve b indicates the temperature of a low-temperature portion of the work having the lowest temperature. If the work is heated by the continuous combustion in the gas burner in this manner, the difference in temperature between the high-temperature and low-temperature portions of the work is gradually increased as the temperature T of the work is raised with passage of time t. Thereupon, if the continuous combustion is switched over to the pulse combustion, the heating by switching ON of the gas burner and the dissipation of heat by switching OFF of the gas burner are repeated alternately for every constant period, as described above, so that the difference in temperature between the high-temperature and low-temperature portions of the work is gradually decreased, and ultimately, the temperature of the entire work becomes substantially uniform. This treatment is referred herein to as a soaking treatment.

Brazing

The melting temperature of a filler metal used for brazing an aluminum article is normally about 590° C. A work heated to a preheating temperature of about 450° C. and subjected to the soaking treatment by the pulse combustion is heated up to the brazing temperature by the continuous combustion in the gas burner. The heating at this time causes the temperature of the work to be raised up to the brazing temperature by heating the entire work by an indirect flame and heating a portion to be brazed by a direct flame. When the brazing temperature has been reached, the continuous combustion is switched over to the pulse combustion. This causes not only the portion to be brazed but also the entire work to be maintained at the brazing temperature and therefore, the work cannot be deformed and also cannot be skin-scorched due to overheating, and the filler metal is melted to flow to a joint portion, thus completing the brazing.

Brazing type

The metal brazing process according to the present invention can be applied to either of a batch feed type and a continuous feed type.

In the case of the batch feed type, in initially setting a work and a part, it is necessary to previously attach a brazing rod with a flux applied thereto on a braze zone. For this purpose, it is desirable to mount a device for automatically delivering the brazing rod with a flux applied thereto to the braze zone to attach it to the braze zone.

In the case of the injection type, a brazing rod with a flux applied thereto is delivered to a braze zone to conduct the brazing at a final brazing step. For this purpose, it is desirable to mount a device for automatically delivering the brazing rod with a flux applied thereto the braze zone in operative association with heating by the burner.

Brazing apparatus

The metal brazing process according to the present invention can be applied to either of a manual brazing apparatus and an automatical brazing apparatus. In the case of the automatical brazing apparatus, if a conveyer system or a turn table system is incorporated, each of the steps can be automatically performed, leading to an enhanced efficiency of operation and a uniformized quality of product. Particularly, if the turn table system is incorporated, the entire apparatus can be compactified, leading to an enhanced efficiency of operation and a reduced cost for the apparatus.

Of course, a compromise combination of the manual and automatic operations is possible. For example, the setting of a work and the removal of a product may be conducted manually, and the preheating and brazing steps may be automated, but any combination of the manual and automatic operations can be selected depending upon the scale and economy of the apparatus.

The above and other objects, features and advantages of the invention will become apparent from a consideration of the following description of the preferred embodiments, taken in conjunction with the accompanying drawings.

DESCRIPTION OF THE PREFERRED EMBODIMENT

The present invention will now be described by way of a preferred embodiment in connection with the accompanying drawings.

Figure 1:
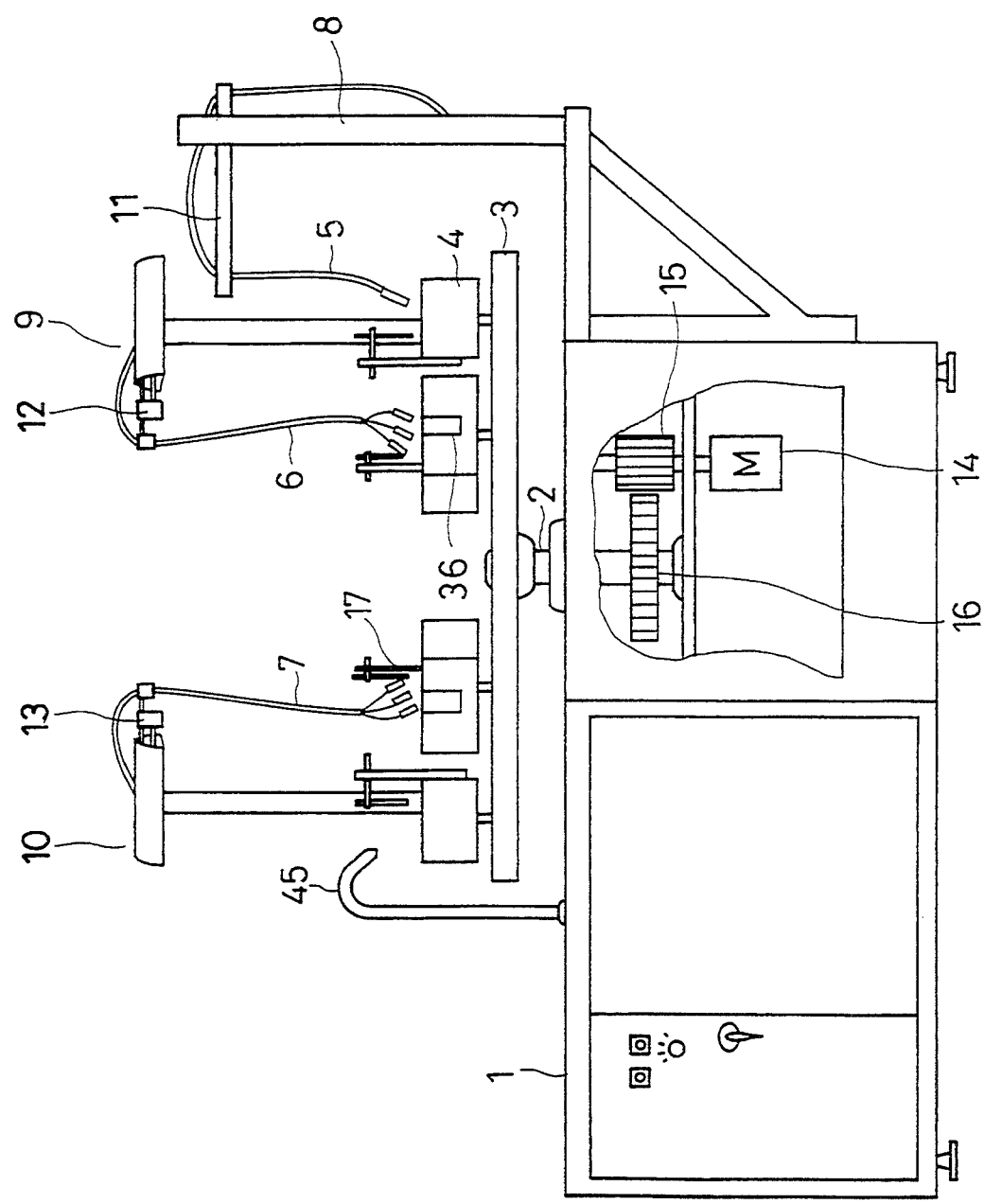
FIG. 1 is side view of an apparatus for brazing a metal according to a first embodiment of the present invention.
Figure 2:
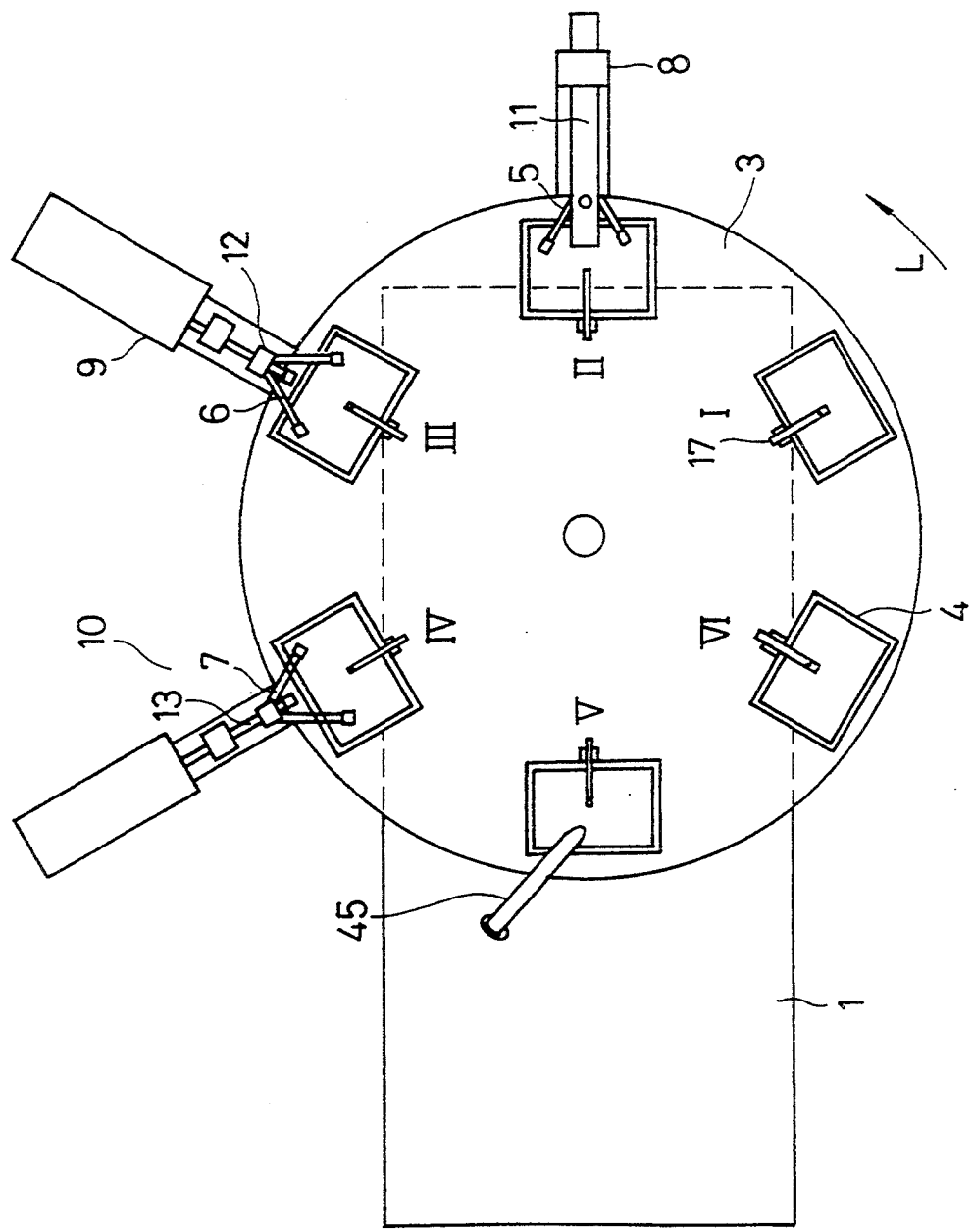
FIG. 2 is a plan view of the apparatus shown in FIG. 1.

Referring to FIGS. 1 and 2, a preferred embodiment of a turn table type automatic brazing apparatus according to the present invention is shown. This apparatus includes a machine base 1 and a turn table 3 mounted on the machine base 1 and adapted to be turned about a rotary shaft 2. Six heat retaining containers 4,4 - - - for accommodating works are provided at equal distances on the turn table 3. A first preheating gas burner 5, a second preheating gas burner 6 and a regular brazing gas burner 7 are disposed at equal distances around the periphery of the turn table 3. Reference numerals 8, 9 and 10 are stands for the first preheating gas burner 5, the second preheating gas burner 6 and the regular brazing gas burner 7, respectively.

The stand 8 for the first preheating gas burner 5 includes a horizontal support member 11 and retains the first preheating gas burner 5 at a predetermined position. Each of the stands 9 and 10 for the second preheating gas burner 6 and the regular brazing gas burner 7 includes a support member 12, 13 expandable and contractable horizontally, respectively and has a function of moving the second preheating gas burner 6 and the regular brazing gas burner 7 toward and away from the heat retaining containers, respectively. A pulse motor 14 is mounted within the machine base 1, and a driving gear 15 is connected directly to a rotary shaft of the pulse motor 14 and adapted to be brought into engagement with a turnable gear 16 secured to the rotary shaft 2 of the turn table 3 to intermittently turn the turn table 3.

Figure 3:
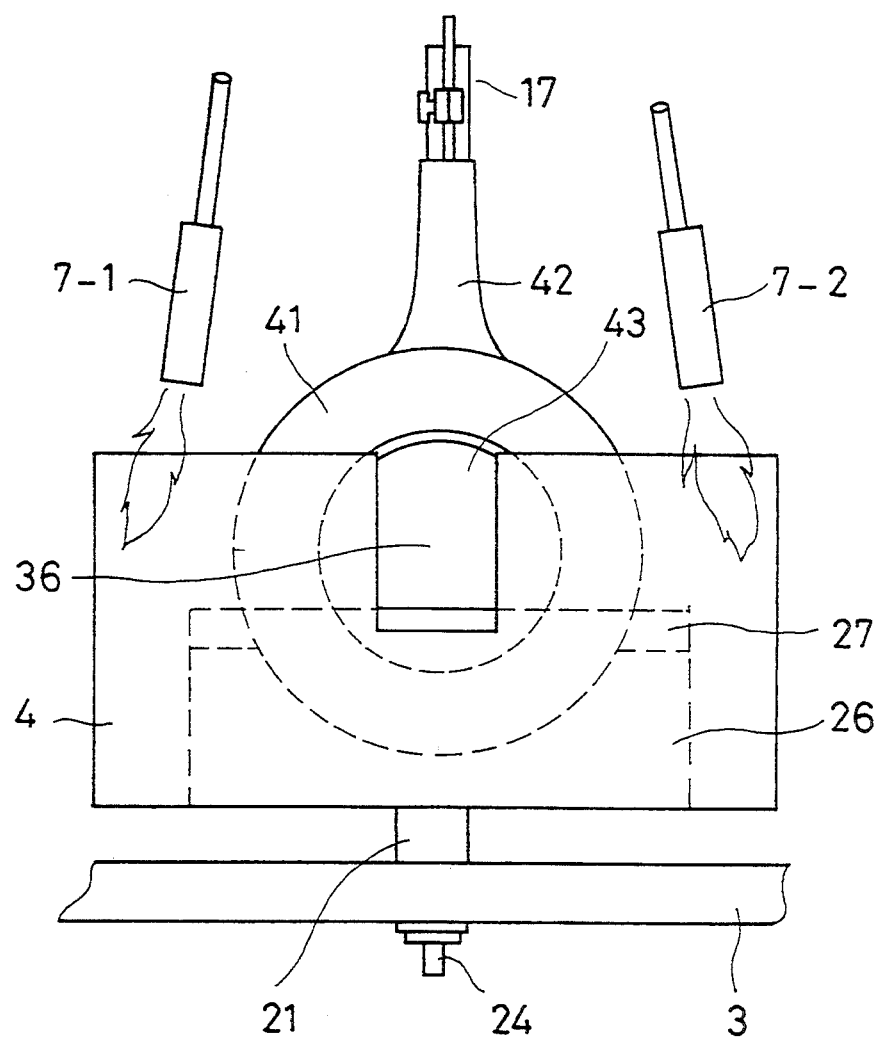
FIG. 3 is a side view of a heat retaining container section of the apparatus shown in FIG. 1.
Figure 4:
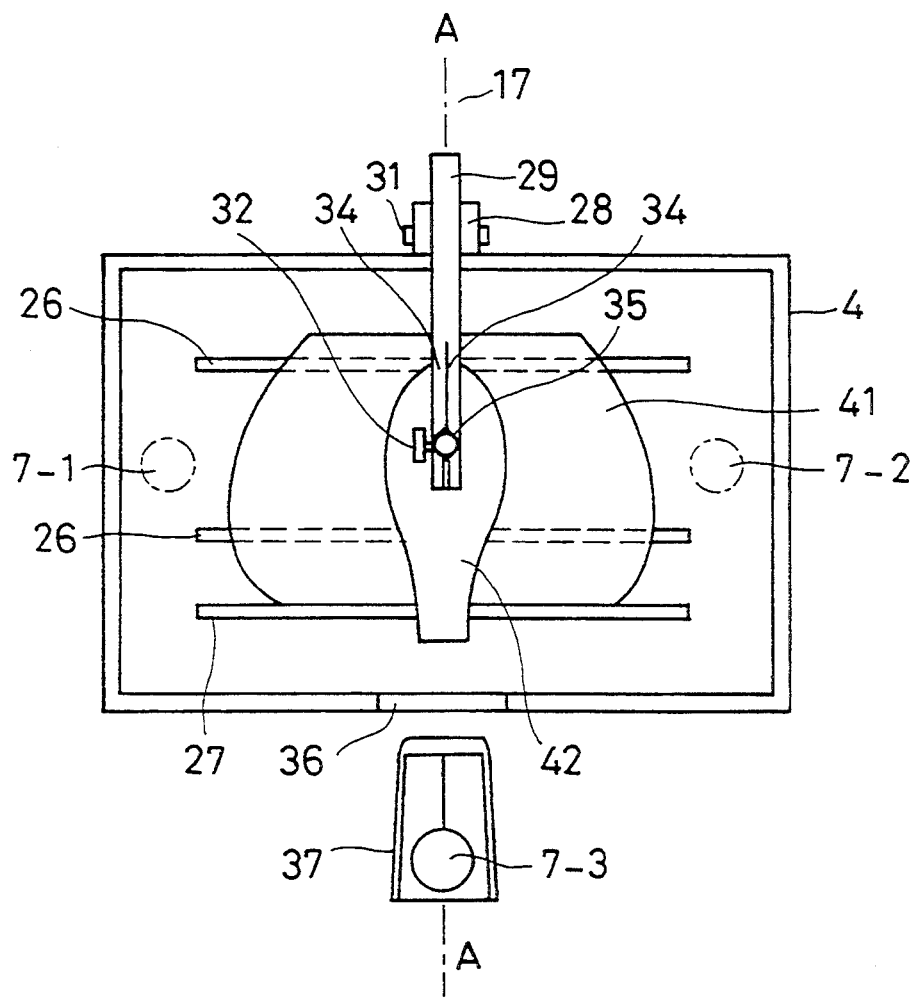
FIG. 4 is a plan view of the heat retaining container section shown in FIG. 3.
Figure 5:
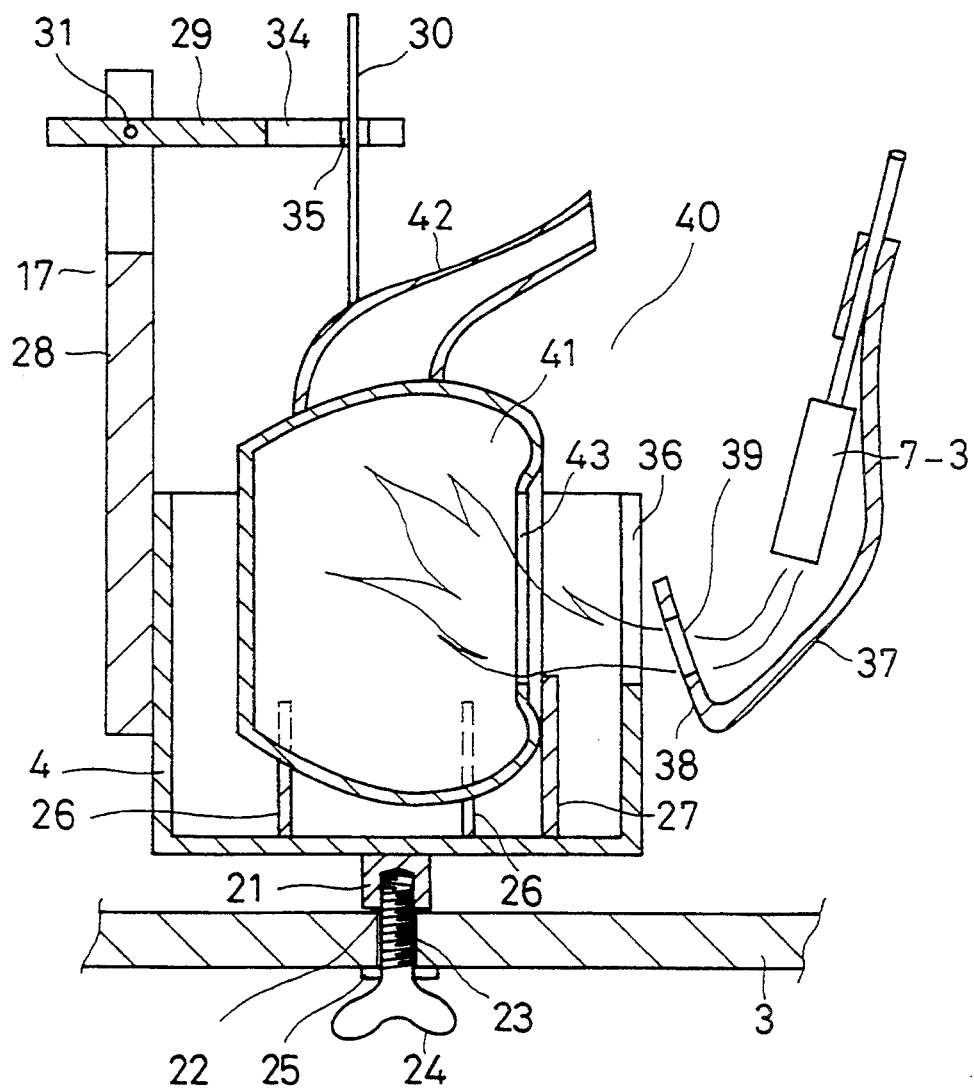
FIG. 5 is a sectional view taken along a line A—A in FIG. 4.

FIGS. 3, 4 and 5 are enlarged views illustrating the heat retaining container 4 mounted on the turn table 3. The heat retaining container 4 is attached to the turn table 3 by a screw 24 through a boss 21. Reference numeral 22 is a thread groove provided in the boss 21; reference numeral 23 is a threaded bore perforated in the turn table 3; and reference numeral 25 is a washer.

Rest 26, 26 each serving as a retaining member for a work, particularly, a kettle, are mounted within the heat retaining container 4, and a front plate 27 is also risingly mounted within the heat retaining container 4 for positioning the kettle and for restraining an extra flame from entering into the kettle.

A retainer 17 for fixing the work is mounted in rear of the heat retaining container 4. A support post 28 for the retainer 17 is risingly mounted on a sidewall of the heat retaining container 4. A turnable rod 29 is turnably mounted at an upper end of the support post 28 for turning movement by a turning shaft 31. A tip end of the turnable rod 29 is bifurcated to form left and right clamping pieces 34, 34. A longitudinal slot 35, through which a supporting bar 30 is inserted, is provided inside each of the clamping pieces 34, 34. The supporting bar 30 inserted through the longitudinal slot 35 is fixed to the turnable rod 29 by means of a setting screw 32. Thus, with the turnable rod 29 turned upwardly, the kettle 40 which is a work is placed onto the rest 26 in the heat retaining container 4, and then, the turnable rod 29 is turned downwardly to bring the tip end of the supporting bar 30 into contact with the upper portion of the kettle. As a result, the kettle 40 is fixed by its own weight with the supporting bar 30.

Three burner heads 7-1, 7-2 and 7-3 are diverged from the regular gas burner 7. The burner heads 7-1 and 7-2 are directed in left and right space portions in the heat retaining container 4 in such a manner that the flame is ejected toward the bottom of the heat retaining container 4. Therefore, the flames from the burner heads 7-1 and 7-2 are striked on and reflected from the bottom of the heat retaining container 4 to ensure that the lower and side surfaces of the kettle are heated by an indirect flame. The burner head 7-3 is disposed in such a manner that the flame therefrom is passed through a notch 36 provided in the sidewall of the heat retaining container 4 via an opening 43 of the kettle into the kettle to heat the inside of the kettle. For this purpose, a flame reflecting plate 37 is mounted to the burner head 7-3. The flame ejected from the burner head 7-3 is turned at a lower curved portion of the reflecting plate 37 to flow through a hole 39 provided in the bent portion 38 at a tip end of the reflecting plate toward the opening 43 of the kettle, thereby heating the kettle from the inside.

The operation of the brazing apparatus of the present invention constructed in the above manner will be described as brazing a mouth to a kettle body 41.

As shown in FIG. 2, the six heat retaining containers 4 are mounted at equal distances on the turn table 3. The turn table 3 is intermittently turned in a direction indicated by an arrow L. First, at a setting step indicated by I, the kettle body 41 (see FIGS. 3 to 5) is placed in the heat retaining container 4, and the mouth 42 with a brazing filler metal previously deposited thereto by a flux is placed onto an upper portion thereof at a predetermined place and fixed by the retainer 17. Then, at a first preheating step indicated by II, the work is heated to about 200° C. by the first preheating gas burner 5. At a second preheating step indicated by III, the work is heated to about 450° C. by the second preheating gas burner 6. In this case, a soaking treatment by a pulse combustion is carried out. Subsequently, at a brazing step indicated by IV, the work is heated to about 590° C. by the regular gas burner 7. Even in this case, a soaking treatment by a pulse combustion is carried out. Thus, the deposited brazing filler metal is allowed to instantaneously flow to a joint portion to complete the brazing. Then, at a cooling step indicated by V, the work is cooled by air ejected from a nozzle 45. Finally, in a recovering step indicated by VI, the work is removed by an operator's hand.

Of course, each of the manual operations at the setting step I and the recovering step VI can be extremely easily replaced by an automated operation using a robot with a current technical art. Although this embodiment has been described as being of a batch feed type, the present invention can be applied to a continuous feed type brazing apparatus. In this case, at the brazing step IV, an automatic filler continuous-feed system with a robot incorporated therein may be used. Such a technique has been already put to practical use by the present inventors (see Japanese Patent Application Laid-open No. 112069/88).

An embodiment of a brazing process according to the present invention will be described as brazing a kettle mouth made of an aluminum alloy to a kettle body also made of an aluminum alloy under following conditions by use of the apparatus of the above-described embodiment.

Heating Condition:
(1) First Preheating
Temperature: 200° C.; two gas burners used; and flame with a weak caloric force
Continuous Combustion: Combustion time of 15 seconds
Pulse Combustion: Combustion time of 15 seconds (Cycle time: 2 seconds, Pulse Width: ±25° C., and ON/OFF ratio=50%:50%)
(2) Second Preheating
Temperature: 450° C.; three gas burners used; and flame with a weak caloric force
Continuous Combustion: Combustion time of 15 seconds
Pulse Combustion: Combustion time of 15 seconds (Cycle time: 2 seconds, Pulse Width: ±25° C., and ON/OFF ratio=50%:50%)
(3) Regular Brazing Operation
Temperature: 590° C.; three gas burners used; and flame with a weak caloric force
Continuous Combustion: Combustion time of 8 seconds
Pulse Combustion: Combustion time of 20 seconds (Cycle time: 2 seconds, Pulse Width: ±25° C., and ON/OFF ratio=50%:50%)
Post-Heating: Continuous combustion for 2 seconds Steps and a variation in temperature of a work in this embodiment will be described below with reference to FIG. 6. First, an idling of the apparatus is conducted for about 2 minutes, and when the temperature of the apparatus is raised, the operation is started.

At the setting step I, a kettle is set in the heat retaining container, and a mouth with a flux-applied filler metal previously deposited thereto is fixed to the kettle at a predetermined location thereof. Then, the turn table is intermittently turned to shift into the first preheating step II (shifting time: 3.5 minutes). At the first preheating step II, a continuous combustion R1 is conducted for 15 seconds, and when the temperature reaches 200° C., the continuous combustion RI is switched over to a pulse combustion P1, by which a soaking treatment is conducted for 15 seconds.

Then, the turn table is turned to shift into the second preheating step III.

At the second preheating step III, a continuous combustion R2 is conducted for 15 seconds, and when the temperature reaches 450° C., the continuous combustion R2 is switched over to a pulse combustion P2, by which a soaking treatment is conducted for 15 seconds. Subsequently, the turn table is turned to shift into the brazing step IV.

At the brazing step IV, a continuous combustion R3 is conducted for 8 seconds, and when the temperature reaches 590° C., the continuous combustion R2 is switched over to a pulse combustion P3, by which the heating is continued for 20 seconds. At a time point when the temperature of the joint portion becomes uniform, the flux and the brazing filler metal are melted, so that the brazing filler metal instantaneously flows to the joint portion, thus completing the brazing. Then, a post-heating is conducted for 2 seconds to shift into the next cooling step V.

At the cooling step V, air is blown against the work to cool the work and then, at the recovering step VI, the work is removed and thrown into cooling water, whereby it is quenched and washed.

Figure 6:
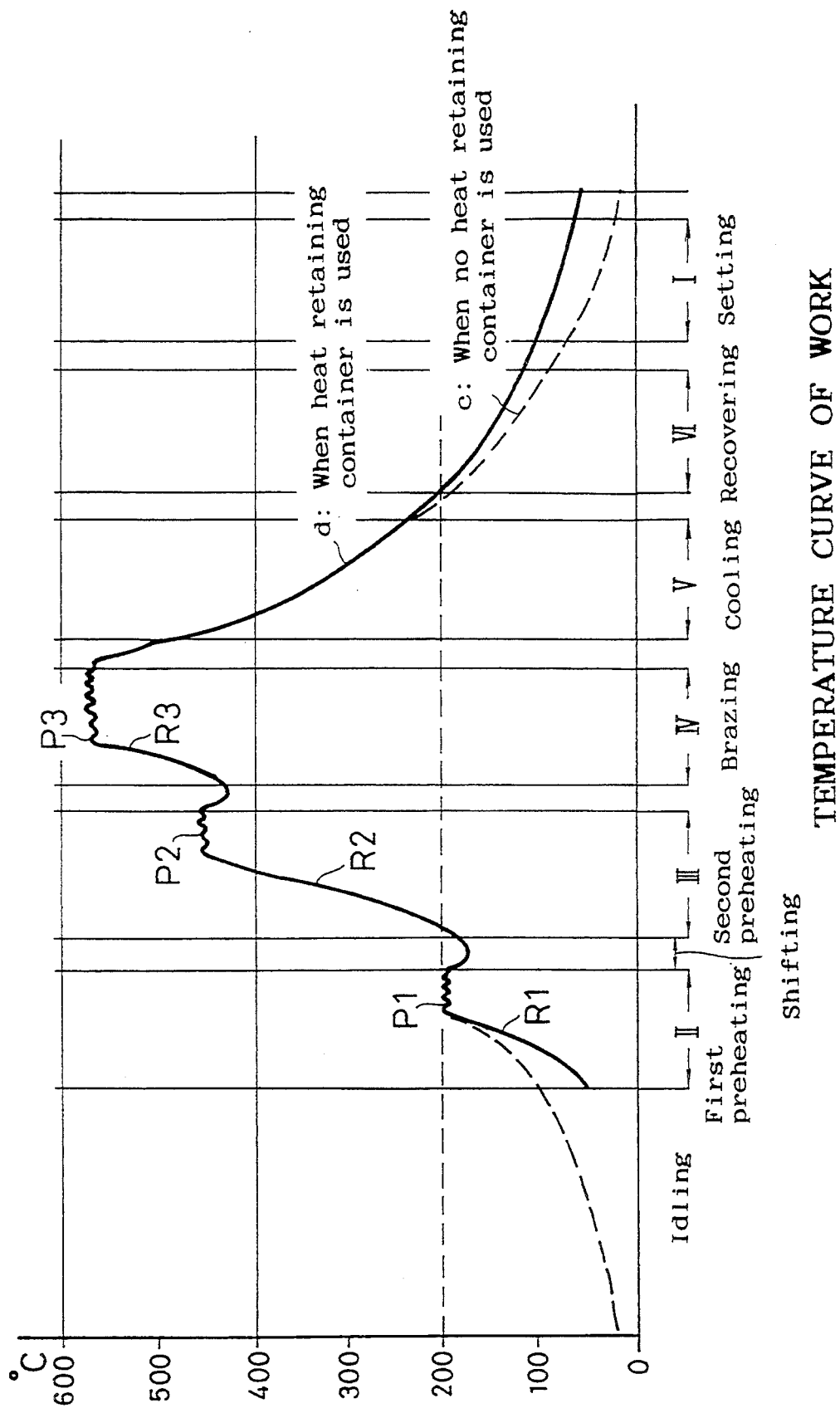
FIG. 6 is a diagram illustrating a heating temperature curve in a brazing process according to the present invention.
Figure 7:
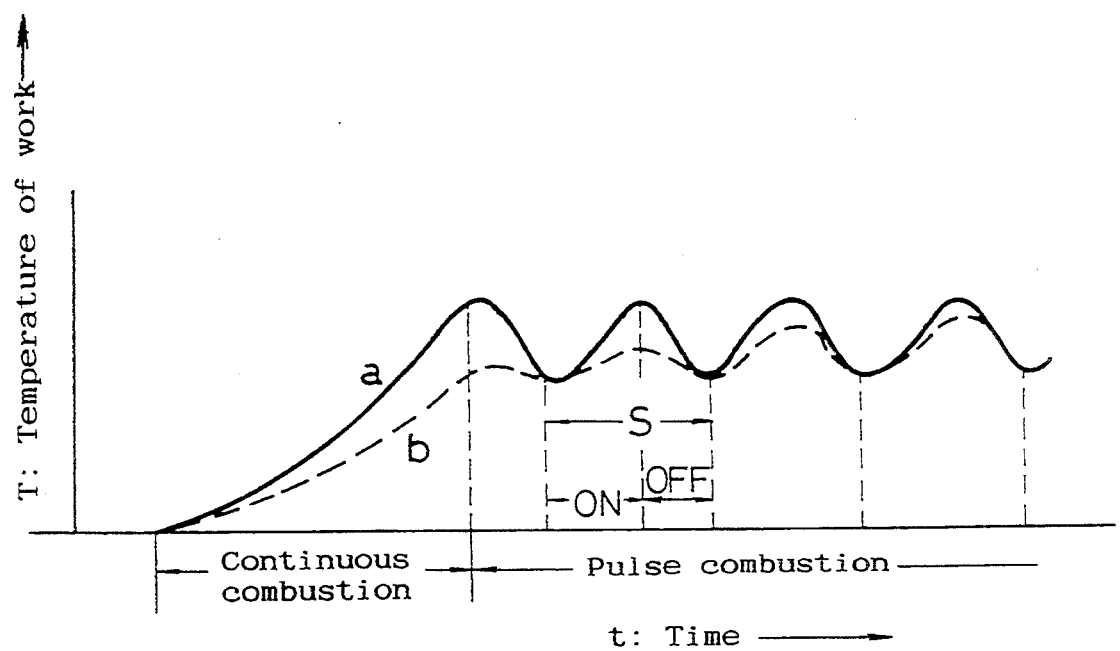
FIG. 7 is a diagram for explaining a pulse combustion in the brazing process.

In FIG. 6, a solid line d indicates a temperature curve provided when the heat retaining container is used, and a dotted line c indicates a temperature curve provided when no heat retaining container is used. As shown in FIG. 6, the work is set in the heat retaining container having a temperature of 80° C. provided by heating at the previous step and hence, the rising of the temperature of the work is extremely fast. This ensures that the cycle time can be shortened as compared with the case where no heat retaining container is used.

What is claimed is:
1. A process for brazing a metal in a continuous manner, comprising the steps of
disposing a work consisting of a base metal and a part to be brazed thereto in a box-shaped heat retaining container opened at an upper portion of said heat retaining container to surround lower and side surfaces of the work and fixing the work by a retaining jig,
heating said work within said heat retaining container by a continuous combustion in a gas burner to raise the temperature of said work to a predetermined preheating temperature and then subjecting the work to a soaking treatment at said preheating temperature by switching-over the combustion in the gas burner to a pulse combustion, and
restarting the continuous combustion in the gas burner to raise the temperature of said work to a brazing temperature and then brazing said part to said base metal with the temperature of said work maintained at the brazing temperature by switching-over the combustion in the gas burner to a pulse combustion.

* * * * *